US011792136B1

(12) United States Patent
Ma et al.

(10) Patent No.: US 11,792,136 B1
(45) Date of Patent: Oct. 17, 2023

(54) SYSTEMS AND METHODS FOR BLOCKCHAIN NETWORK OPTIMIZATION

(71) Applicant: Coinbase, Inc., Oakland, CA (US)

(72) Inventors: Yao Ma, Scarsdale, NY (US); Ziqiang Liu, Great Neck, NY (US); Indra Rustandi, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 0 days.

(21) Appl. No.: 17/809,971

(22) Filed: Jun. 30, 2022

(51) Int. Cl.
*H04L 12/24* (2006.01)
*H04L 12/911* (2013.01)
*H04L 47/70* (2022.01)
*H04L 41/16* (2022.01)
*H04L 47/83* (2022.01)

(52) U.S. Cl.
CPC ............ *H04L 47/826* (2013.01); *H04L 41/16* (2013.01); *H04L 47/83* (2022.05)

(58) Field of Classification Search
CPC ..... H04L 41/08; H04L 41/0894; H04L 41/14; H04L 41/142; H04L 41/145-147; H04L 41/16; H04L 43/04; H04L 43/06; H04L 43/067; H04L 47/70; H04L 47/82; H04L 47/826; H04L 47/83
See application file for complete search history.

(56) References Cited

U.S. PATENT DOCUMENTS

| | | | | |
|---|---|---|---|---|
| 9,483,785 | B1* | 11/2016 | Corley | ............... H04L 67/1097 |
| 9,720,732 | B1* | 8/2017 | Shih | ...................... G06F 9/4887 |
| 2016/0034835 | A1* | 2/2016 | Levi | ....................... H04L 67/10 |
| | | | | 705/7.23 |
| 2019/0372345 | A1* | 12/2019 | Bain | .................. G06Q 30/0601 |
| 2021/0144517 | A1* | 5/2021 | Guim Bernat | ........ H04L 9/0637 |
| 2022/0197773 | A1* | 6/2022 | Butler | .................. H04N 21/234 |

OTHER PUBLICATIONS

Vermaak, "8 Reasons Why Your Bitcoin Transaction is Delayer", CoolWallet (Year: 2019).*

* cited by examiner

*Primary Examiner* — Boris D Grijalva Lobos
(74) *Attorney, Agent, or Firm* — Perkins Coie LLP

(57) ABSTRACT

In some aspects, a computing system may use time series data and machine learning to determine an efficient time to send data to a blockchain. A machine learning model may use a variety of blockchain related data to predict a network usage costs for different times in the future. The predicted network usage costs may be used to determine when data should be sent for storing on the blockchain to reduce network resource costs for a computing system. For example, based on inputting the blockchain data into the machine learning model, a computing system may generate output indicating network usage costs for a future time period, with each network usage cost corresponding to a timestamp within the future time period. The computing system may determine a minimum network usage cost of the network usage costs and send data to a node in the blockchain network at the corresponding timestamp.

22 Claims, 8 Drawing Sheets

US 11,792,136 B1

SYSTEMS AND METHODS FOR BLOCKCHAIN NETWORK OPTIMIZATION

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

Blockchains are often decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks. However, some blockchain operations (e.g., having data stored on the blockchain, adding a new block to the blockchain, etc.) may require blockchain network resources. The amount of network resources required can vary depending on a number of factors.

SUMMARY

With some blockchain technology, the amount of resources needed to complete a blockchain operation may vary a great deal. The amount of resources required may vary based on the number of users attempting to send data to the blockchain, the number of blockchain node devices that are generating new blocks, previous resource requirements, or a variety of other factors. In some cases, a blockchain may even be deemed too slow or expensive to use, which may limit the effectiveness of the technology. Due to the unpredictable nature of the network resources required at different times, existing computing systems may send data to the blockchain at a time when network resource costs are high and thus may end up using network resources inefficiently. In fact, sending data to the blockchain at a time when network resource costs are high may lead to further network resource costs increases for other computing devices.

To address the network inefficiency issues above, methods and systems described herein may use time series data and machine learning to determine an efficient time to send data to a blockchain. Specifically, a machine learning model may use a variety of blockchain related data to predict the network usage costs for different times in the future. The predicted network usage costs may be used to determine when data should be sent for storing or executing on the blockchain to reduce network resource costs for a computing system. For example, based on inputting the blockchain data into the machine learning model, a computing system may generate output indicating network usage costs for a future time period, with each network usage cost corresponding to a timestamp within the future time period. The computing system may determine a minimum network usage cost of the network usage costs and send data to a node in the blockchain network at the corresponding timestamp. By doing so, the computing system may reduce the amount of blockchain network resources required to store or execute data on the blockchain and may reduce computer network usage inefficiencies.

In some aspects, a computing system may obtain a request to send data to a node in a blockchain network, wherein the request comprises a data recipient, a priority network usage cost, and a maximum network usage cost. The computing system may obtain blockchain data corresponding to a predetermined time window, wherein the blockchain data comprises a first plurality of block sizes, and a first plurality of network usage costs. The computing system may input the blockchain data into a machine learning model, wherein the machine learning model has been trained on a time series dataset corresponding to a historical time period, the time series data comprising a second plurality of block sizes and a second plurality of network usage costs during the historical time period. The computing system may generate, via the machine learning model, output indicating a plurality of network usage costs for a future time period, wherein each network usage cost of the plurality of network usage costs corresponds to a timestamp within the future time period. The computing system may determine a minimum network usage cost of the plurality of network usage costs and may determine a time to send the data to the node in the blockchain network based on the minimum network usage cost.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
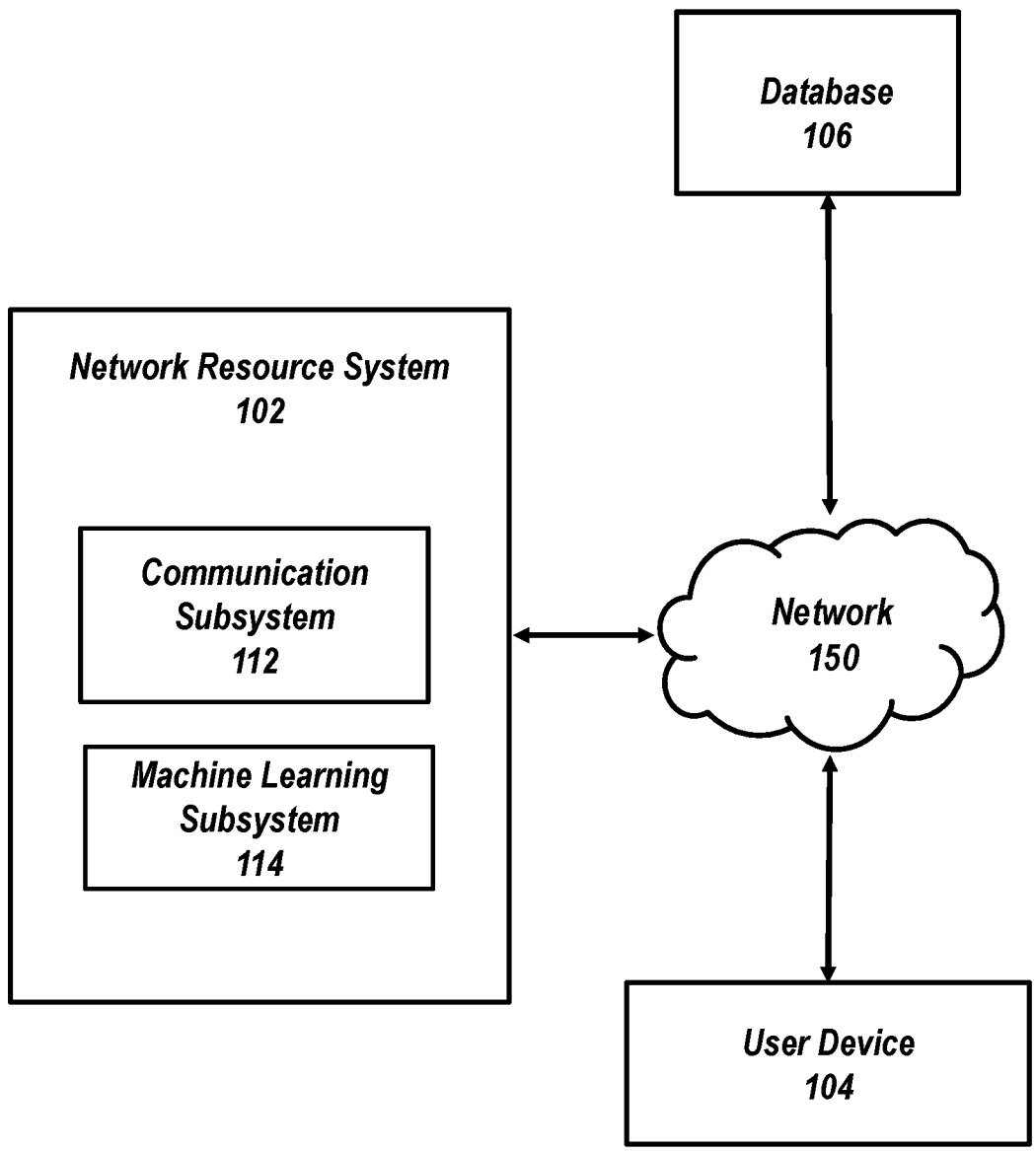
FIG. 1 shows an illustrative diagram for using machine learning and time series data to determine an efficient time to send data, in accordance with one or more embodiments.

FIG. 1 shows an example system 100 for using machine learning and time series data to determine an efficient time to send data. The system 100 may include a network resource system 102, a database 106, a user device 104, or other components/devices. The network resource system 102 may include a communication subsystem 112, a machine learning subsystem 114, or other components. Each of the network resource system 102, the database 106, and/or the user device 104 may be a variety of computing devices (e.g., physical or virtual) including a server, a virtual machine, a desktop, a mobile device (e.g., a smartphone) or any other device or component described below in connection with FIGS. 2-7. It should be noted that, while one or more operations are described herein as being performed by particular components of network resource system 102, those operations may, in some embodiments, be performed by other components of network resource system 102 or other components of system 100. As an example, while one or more operations are described herein as being performed by components of network resource system 102, those operations may, in some embodiments, be performed by components of user device 104. It should be noted that, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments).

The network resource system 102 may obtain a request to send data to a node in a blockchain network. The data may include any data that may be used in a blockchain operation (e.g., as described in more detail below). For example, the data may include transaction data. The request may include an identification of a data recipient. The request may include network usage information. The network usage information may include a priority network usage cost or a maximum network usage cost. A priority network usage cost may be an amount that a user is willing to pay to incentivize one or more blockchain node operators (e.g., blockchain miners) to record the data (e.g., record a transaction) in a blockchain associated with the blockchain network. The priority network usage cost may compensate blockchain node operators for executing and propagating user transactions in blocks. The maximum network usage cost may be the maximum amount that a user is willing to pay to have data recorded on the blockchain. For example, the maximum amount may include a total of the priority network usage cost and a base network usage cost. In some embodiments, the maximum amount may include the priority network usage cost, the base network usage cost, or a variety of other costs associated with the blockchain.

The network resource system 102 may obtain blockchain data corresponding to a time window. The time window may be a time period in the past. For example, the time window may be the previous 12 hours, the previous day, the previous two weeks, or a variety of other time periods. The blockchain data may include a first plurality of block sizes or a first plurality of network usage costs. A block size may indicate the amount of data that may be stored in a block in a blockchain. In some embodiments, the block size may be variable. For example, the block size may change based on demand or the amount of data that has been requested to be added to the blockchain. The blockchain data may be used as input into a machine learning model. For example, the machine learning model may use the blockchain data to determine network usage costs for a future time period. The first plurality of network usage costs may be time series data. The first plurality of network usage costs may include a set of network usage costs for individual time windows within the time period in the past. For example, the first plurality of network usage costs may include all of the network usage costs for blockchain operations that occurred within each hour (or minute, day, etc.) during a historical time period. Alternatively, the first plurality of network usage costs may include a measurement of the network usage cost for each hour, minute, day, or other time period.

In some embodiments, the network resource system 102 may obtain a variety of blockchain data that may be used as input into one or more machine learning models described below. For example, the blockchain data may include time series data that indicates any blockchain operations that have yet to be recorded on the blockchain (e.g., mempool data). For example, the blockchain data may include any pending transactions that have yet to be stored on the blockchain. When data is sent to the blockchain it may take some time before it is recorded. The network resource system 102 may obtain this data and may use it as input into a machine learning model described herein to determine a future network usage costs associated with the blockchain. The blockchain data may include a transaction type (e.g., type of token, whether the transaction was for a non-fungible token (NFT), etc.), transaction amount, wallet addresses used for the transaction, or a variety of other transaction data. The blockchain data may include the number of nodes that are operating on the blockchain (e.g., miners, stake pool operators, etc.).

The network resource system 102 may input the blockchain data into a machine learning model. The machine learning model may include a long short-term memory model or a regression model. The machine learning model may be a variety of machine learning models, including for example, any machine learning model described in connection with FIGS. 1-6 above. The machine learning model may have been trained on a time series dataset that corresponds to a historical time period. The time series dataset may include a plurality of timestamps during the historical time period and a variety of data associated with each timestamp of the plurality of timestamps. For example, the variety of data may include network usage costs (e.g., priority network usages costs, base network usage costs, or a variety of other network usage costs), block sizes, transaction information (e.g., an identification of one or more parties of a transaction, transaction amount, an identification of what was exchanged between parties of the transaction, etc.), the number of active miners or active stake pool operators at a corresponding timestamp, or a variety of other data.

The network resource system 102 may generate output indicating a plurality of network usage costs for a future time period. The plurality of network usage costs may be generated via the machine learning. Each network usage cost of the plurality of network usage costs may correspond to a timestamp within the future time period. For example, the machine learning model may output a network usage cost for each hour in a future twelve hour time period. The future time period may begin starting at the current time. Additionally or alternatively, the future time period may include time that is more than a threshold amount of time in the future. For example, the future time period may include time that is three days after a current time, a month after a current time, or some other future time period. In some embodiments, the future time period may be indicated by the request to send data. For example, the future time period may be set by a user via the user device 104.

The network resource system 102 may determine a minimum network usage cost. For example, the network resource system 102 may determine a minimum network usage cost of the plurality of network usage costs. The network resource system 102 may determine a time to send the data to the node in the blockchain network. For example, the network resource system 102 may determine, based on the minimum network usage cost, a time to send the data to the node in the blockchain network. The time may correspond to a minimum network usage cost of the plurality of network usage costs. For example, the network resource system 102 may determine to send the data at or around the time indicated by the timestamp that corresponds to the minimum network usage cost.

The network resource system 102 may schedule the data to be sent at the determined time. For example, the network resource system 102 may send the data via the communication subsystem 112 at the determined time. In some embodiments, the network resource system 102 may determine ranges for network costs. For example, based on the output of the machine learning model, the network resource system 102 may determine a network cost range for each network usage cost of the plurality of network usage costs. The network cost range may indicate a predicted minimum network usage cost or a maximum network usage cost for a timestamp. The network cost range may include a probability or confidence score indicating how likely or how confident the network resource system 102 is in its predicted network cost range.

In some embodiments, the network resource system 102 may determine that the data should not be sent or that the network resource system 102 should wait for a time period until a better (e.g., lower) network usage cost can be achieved. For example, the network resource system 102 may determine, based on the output of the machine learning model, that the minimum network usage cost is greater than a threshold cost. Based on the minimum network usage cost being greater than the threshold cost, the network resource system 102 may postpone sending the data to the node in the blockchain network. Additionally or alternatively, the network resource system 102 may receive input from a user. The input may indicate whether the network resource system 102 should postpone sending the data to the node in the blockchain. Based on the input, the network resource system 102 may send the data or may wait to send the data.

Figure 2:
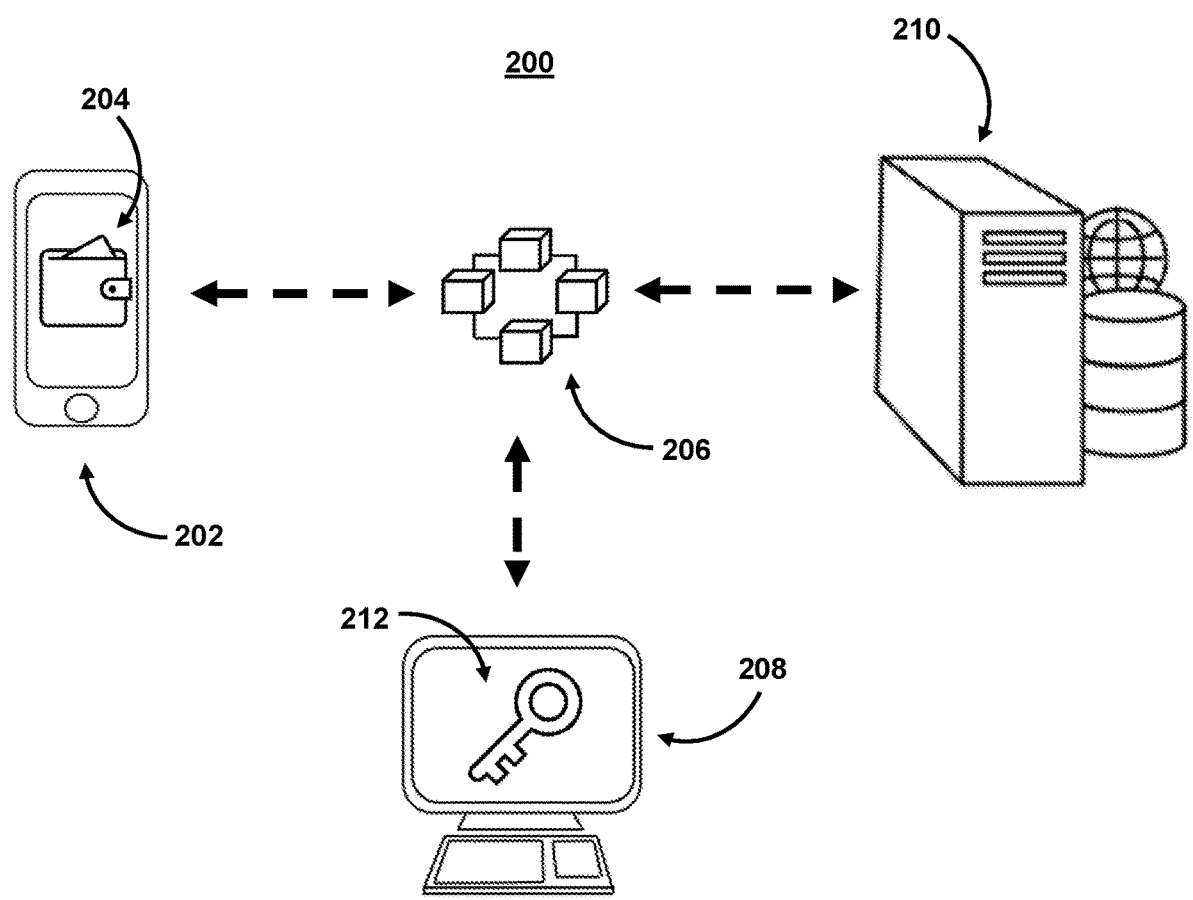
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to store data sent by one or more components described above in connection with FIG. 1.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to initiate sending data to a node in a blockchain network (e.g., via the network resource system 102), and the user interface may display content related to network usage costs or recommended times for sending data to a node in a blockchain (e.g., the timestamp corresponding to the predicted minimum network usage cost as described in connection with FIG. 1 or 7). As referred to herein, "content" should be understood to mean an electronically consumable user asset, representations of goods or services (including nonfungible tokens), Internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices in FIG. 2 or the user device 104 of FIG. 1 may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to using machine learning and time series data to determine an efficient time to send data (e.g., as described in connection with FIG. 1 or FIG. 7). As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or digital signature. For example, system 200 may use cryptographic systems for conducting blockchain operations such as storing data on a blockchain, performing a transaction associated with a smart contact, or a variety of other blockchain operations. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proofof-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
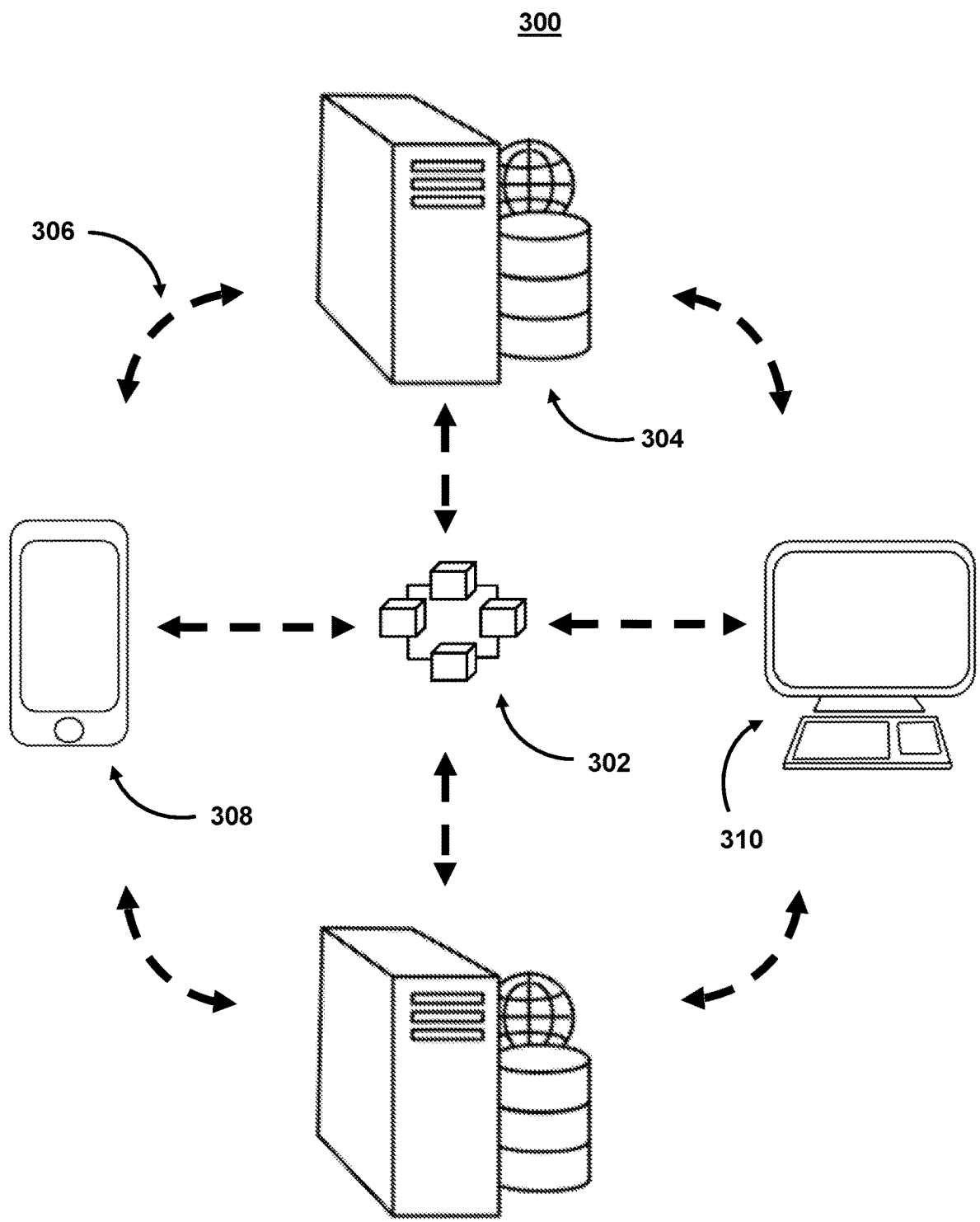
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may implement a decentralized application that uses machine learning and time series data to determine an efficient time to send data (e.g., as described in connection with FIG. 1 or FIG. 7) within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to using machine learning and time series data to determine an efficient time to send data to a node in a blockchain within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the Internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
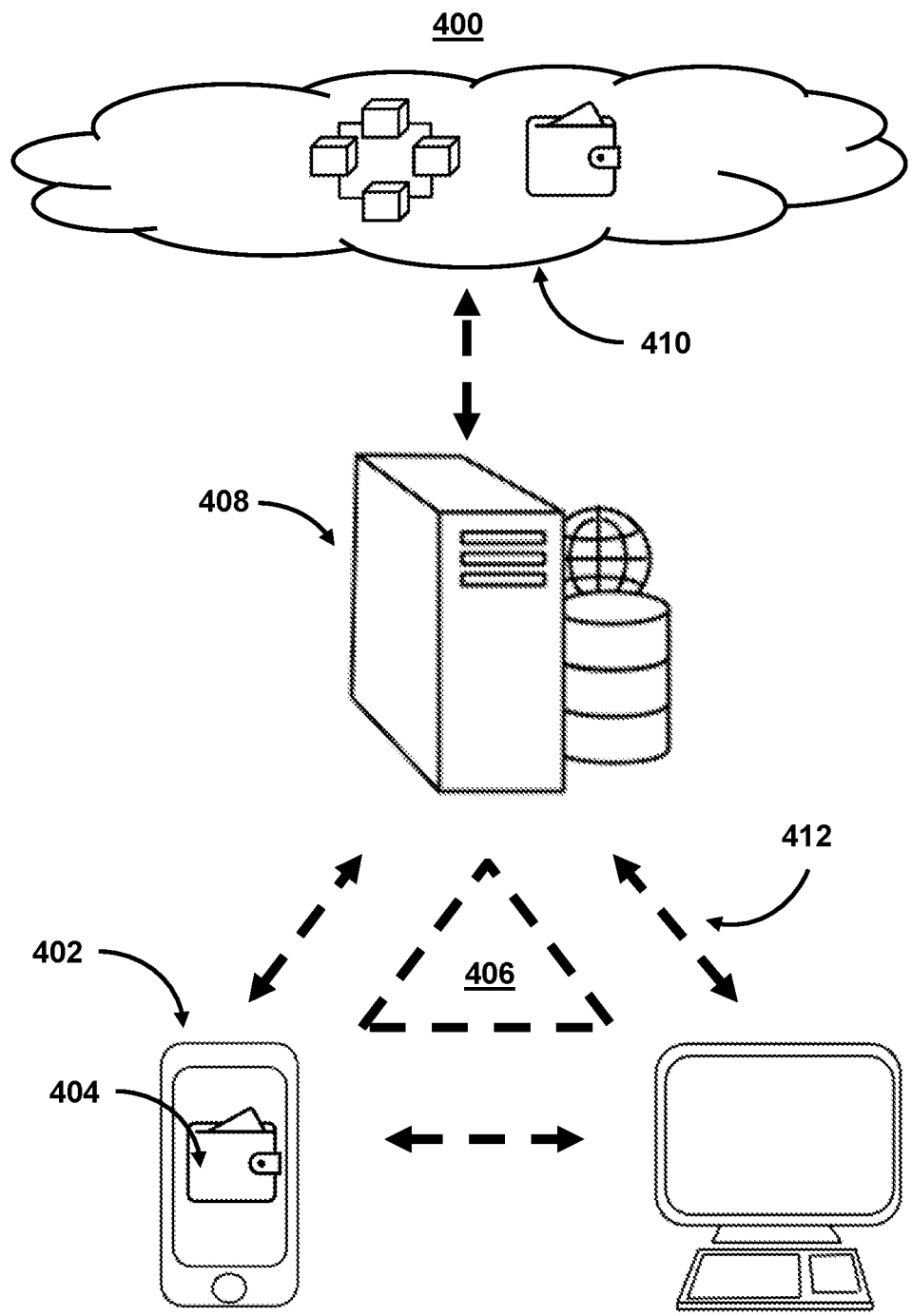
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to use machine learning and time series data to determine an efficient time to send data. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate reducing computer network usage inefficiencies by using machine learning and time series data to determine an efficient time to send data. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insultation, from the blockchain, for remedial blockchain operations. For example, system 400 may have a separate storage, protected by the second ledger (e.g., a ledger service), for reads, and by a transfer service, for writes, that reflect the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in a easily parseable format, doing translations between human-intended method calls and smart-contract operations discoverable and reliable.

For example, ABI defines the methods and structures used to interact with the binary contract similar to an API, but on a lower-level. The ABI indicates the caller of the function to encode (e.g., ABI encoding) the needed information like function signatures and variable declarations in a format that the EVM can understand to call that function in bytecode. ABI encoding is may be automated by the system using compilers or wallets interacting with the blockchain.

Figure 5:
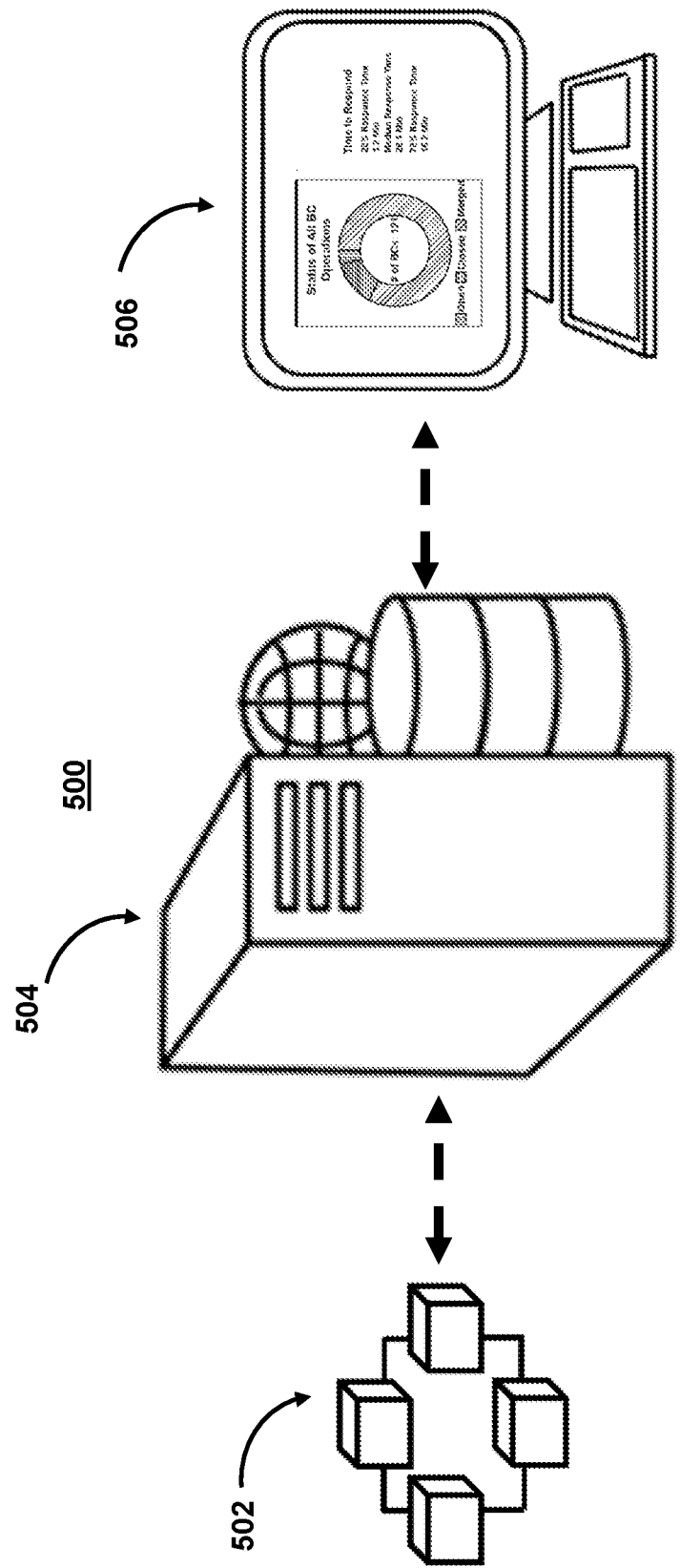
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to store data (e.g., in the database 106) that may be used to train a machine learning model to determine an efficient time to send data (e.g., as described in connection with FIG. 1 or FIG. 7). Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, time stamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether or not the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
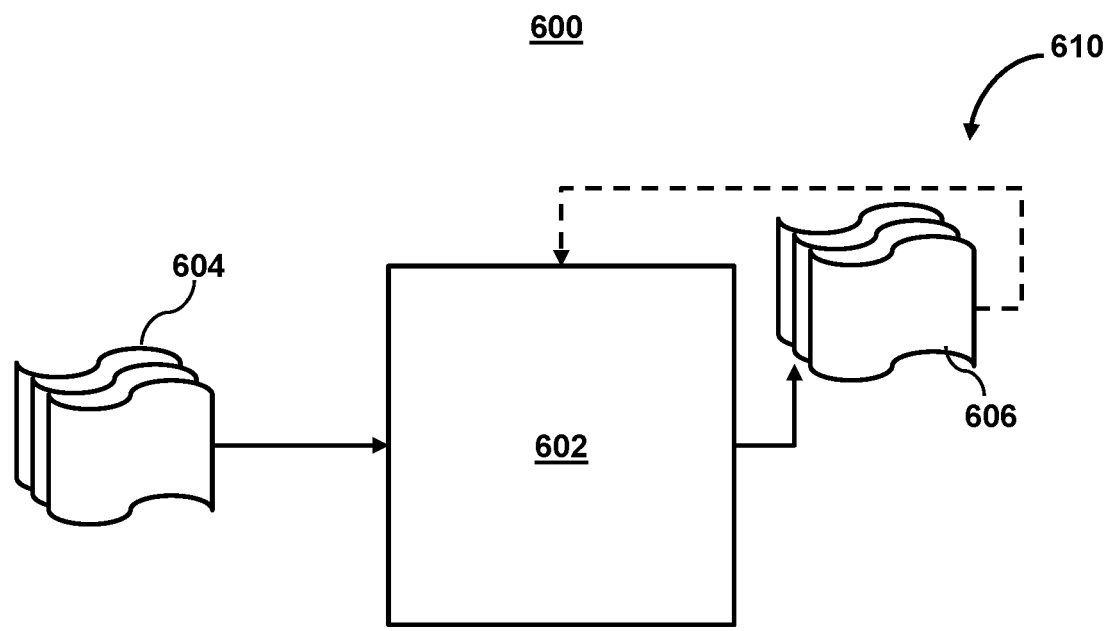
FIG. 6 shows an example machine learning model, in accordance with some embodiments.

One or more machine learning models discussed herein may be implemented, for example, as shown or described in connection with FIG. 6. With respect to FIG. 6, machine learning model 642 may take inputs 644 and provide outputs 646. In one use case, outputs 646 may be fed back to machine learning model 642 as inputs to train machine learning model 642 (e.g., alone or in conjunction with user indications of the accuracy of outputs 646, labels associated with the inputs, or with other reference feedback information). In another use case, machine learning model 642 may update its configurations (e.g., weights, biases, or other parameters) based on its assessment of its prediction (e.g., outputs 646) and reference feedback information (e.g., user indication of accuracy, reference labels, or other information). In another example use case, machine learning model 642 is a neural network and connection weights may be adjusted to reconcile differences between the neural network's prediction and the reference feedback. In a further use case, one or more neurons (or nodes) of the neural network may require that their respective errors be sent backward through the neural network to them to facilitate the update process (e.g., backpropagation of error). Updates to the connection weights may, for example, be reflective of the magnitude of error propagated backward after a forward pass has been completed.

In some embodiments, the machine learning model 642 may include an artificial neural network. In some embodiments, the machine learning model 642 may include an input layer and one or more hidden layers. Each neural unit of the machine learning model may be connected with one or more other neural units of the machine learning model 642. Such connections can be enforcing or inhibitory in their effect on the activation state of connected neural units. Each individual neural unit may have a summation function that combines the values of all of its inputs together. Each connection (or the neural unit itself) may have a threshold function that a signal must surpass before it propagates to other neural units. The machine learning model 642 may be self-learning or trained, rather than explicitly programmed, and may perform significantly better in certain areas of problem solving, as compared to computer programs that do not use machine learning. During training, an output layer of the machine learning model 642 may correspond to a classification, and an input known to correspond to that classification may be input into an input layer of the machine learning model during training. During testing, an input without a known classification may be input into the input layer, and a determined classification may be output. For example, the classification may be an indication of whether an action is predicted to be completed by a corresponding deadline or not. The machine learning model 642 trained by the machine learning subsystem 114 may include one or more embedding layers at which information or data (e.g., any data or information discussed above in connection with FIGS. 1-5) is converted into one or more vector representations. The one or more vector representations of the message may be pooled at one or more subsequent layers to convert the one or more vector representations into a single vector representation.

The machine learning model 642 may be structured as a factorization machine model. The machine learning model 642 may be a non-linear model or supervised learning model that can perform classification or regression. For example, the machine learning model 642 may be a general-purpose supervised learning algorithm that the system uses for both classification and regression tasks. Alternatively, the machine learning model 642 may include a Bayesian model configured to perform variational inference. The machine learning model 642 may be configured to determine an efficient time to send data or a variety of other functions described herein.

Figure 7:
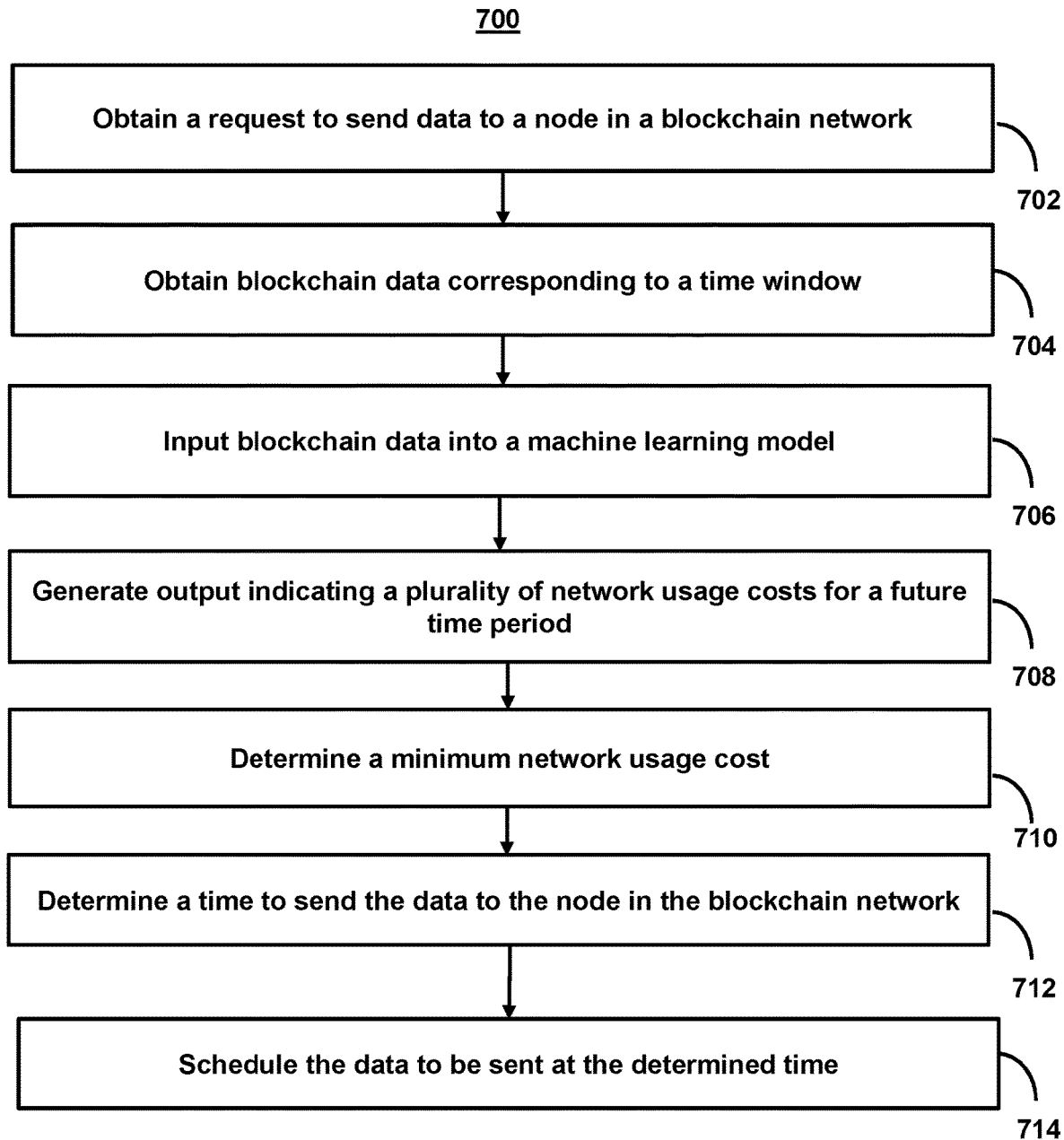
FIG. 7 shows a flowchart of the steps involved in using machine learning and time series data to determine an efficient time to send data, in accordance with one or more embodiments.

FIG. 7 shows a flowchart of the steps involved using machine learning and time series data to determine an efficient time to send data, in accordance with one or more embodiments. For example, the system may use process 700 (e.g., as implemented on one or more system components described above) in order to reducing computer network usage inefficiencies.

At step 702, process 700 (e.g., using one or more components described above) may obtain a request to send data to a node in a blockchain network. The request may include an identification of a data recipient. The request may include network usage information. The network usage information may include a priority network usage cost and a maximum network usage cost. For example, the priority network usage cost may be an amount that a user is willing to pay to incentivize one or more blockchain node operators to record the data (e.g., record a transaction) in a blockchain associated with the blockchain network. As an additional example, the maximum network usage cost may be the maximum amount that a user is willing to pay to have data recorded on the blockchain. For example, the maximum amount may include a total of the priority network usage cost and a base network usage cost. In some embodiments, the maximum amount may include the priority network usage cost, the base network usage cost, or a variety of other costs associated with the blockchain.

At step 704, process 700 (e.g., using one or more components described above) may obtain blockchain data corresponding to a time window. The time window may be a time period in the past. For example, the time window may be the previous 12 hours, the previous day, the previous two weeks, or a variety of other time periods. The blockchain data may include a first plurality of block sizes or a first plurality of network usage costs. The blockchain data may be used as input into a machine learning model. For example, the machine learning model may use the blockchain data to determine network usage costs for a future time period.

At step 706, process 700 (e.g., using one or more components described above) may input the blockchain data into a machine learning model. The machine learning model may include a long short-term memory model or a regression model. The machine learning model may be a variety of machine learning models, including for example, any machine learning model described in connection with FIGS. 1-6 above. The machine learning model may have been trained on a time series dataset that corresponds to a historical time period. The time series dataset may include a plurality of timestamps during the historical time period and a variety of data associated with each timestamp of the plurality of timestamps. For example, the variety of data may include network usage costs (e.g., priority network usages costs, base network usage costs, or a variety of other network usage costs), block sizes, transaction information (e.g., an identification of one or more parties of a transaction, transaction amount, an identification of what was exchanged between parties of the transaction, etc.), the number of active miners or active stake pool operators at a corresponding timestamp, or a variety of other data.

In some embodiments, the embeddings may be generated based on the blockchain data and the embeddings may be input into the machine learning model. For example, inputting the blockchain data into the machine learning model may include generating a plurality of embeddings that are representative of the first plurality of network usage costs, and inputting the plurality of embeddings into the machine learning model.

In some embodiments, embeddings (e.g., vector representations) of a portion of the variety of data described above may be generated and input into the machine learning model. For example, inputting the blockchain data into the machine learning model may include generating a plurality of embeddings that are representative of a plurality of block sizes, and inputting the plurality of embeddings into the machine learning model.

At step 708, process 700 (e.g., using one or more components described above) may generate output indicating a plurality of network usage costs for a future time period. The plurality of network usage costs may be generated via the machine learning. Each network usage cost of the plurality of network usage costs may correspond to a timestamp within the future time period. For example, the machine learning model may output a network usage cost for each hour in a future twelve hour time period. The future time period may begin starting at the current time. Additionally or alternatively, the future time period may include time that is more than a threshold amount of time in the future. For example, the future time period may include time that is three days after a current time, a month after a current time, or some other future time period. In some embodiments, the future time period may be indicated by the request to send data. For example, the future time period may be set by a user via the user device 104.

Figure 8:
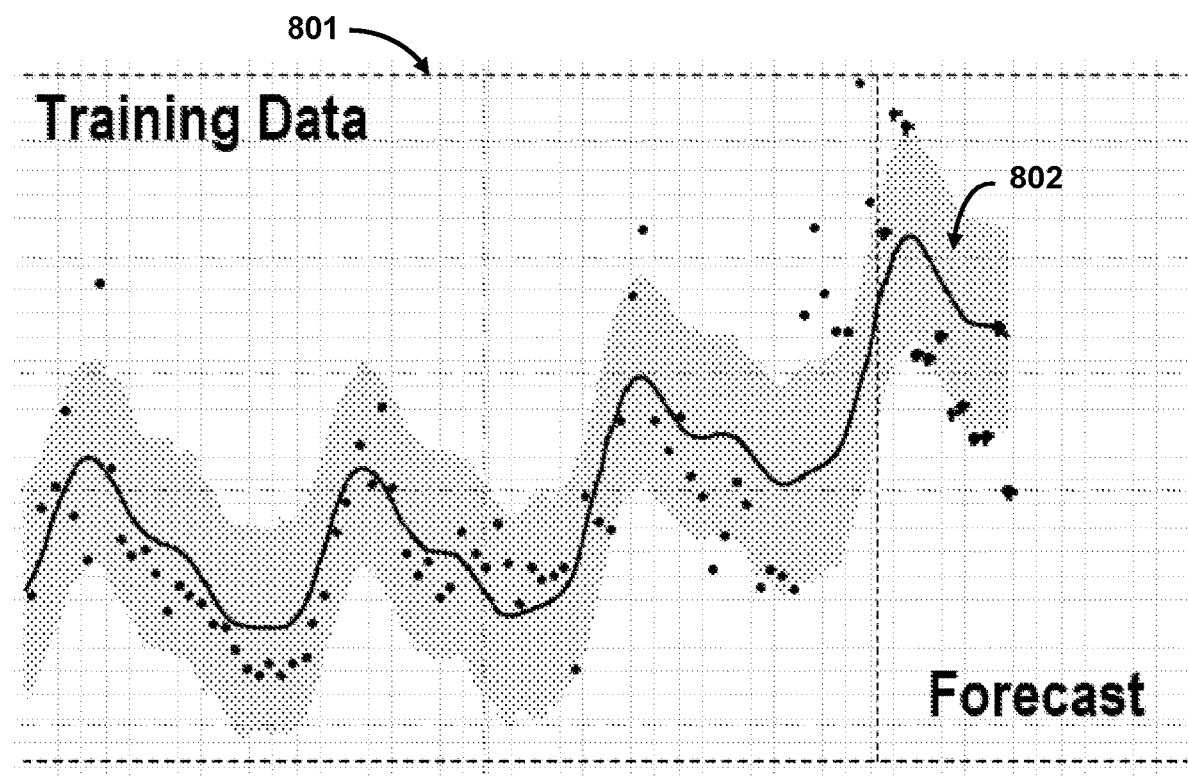
FIG. 8 shows example training data and output for a machine learning model, in accordance with some embodiments.

In some embodiments, the machine learning model may include a first model and a second model (e.g., a first stage model and a second stage model). The first model may detect recurrent patterns in time series data and may generate output indicating a future pattern for network usage costs. The network resource system 102 may use the first model to determine an average or expected network usage cost for each timestamp (e.g., each hour, minute, or other time interval) in the future time period. For example, the first model may generate output indicating a network usage cost for a time of day (e.g., evenings, mornings, etc.), a time of week (e.g., weekends, Sunday evening, etc.), or a time of year (e.g., holidays, at the end of each quarter, a particular month) or a variety of other time periods. The output may indicate that the network usage cost is high (e.g., higher than a threshold) or low (e.g., lower than a threshold) for the future time period. Referring to FIG. 8, example data and output for the first model is shown. The first model may take as input training data 801. The training data may include time series data that indicates a historical network usage cost for a plurality of time stamps. For example, the time series data may include the network usage cost for each hour in a two week time period, a two year time period, or a variety of other time periods. In some embodiments, the training data or time series data may include data discussed above in connection with FIGS. 1-7 such as pending blockchain operation information (e.g., mempool data), block size, transaction information, or the number of active blockchain node operators. The first machine learning model may generate output 802 that indicates a trend or forecast for future network usage costs. The output 802 may be used as input into the second machine learning model or second stage model.

The second model may be used by the network resource system 102 to determine specific price changes within the future time period. The second model may take as input, the output 802 that was generated by the first model and/or may take as input the latest observed gas price or any other data discussed in FIGS. 1-7 to generate output indicating price changes within the future time period. For example, the second model may be a regression model. The second model may use the output 802 to generate a prediction indicating whether the network usage cost may go down more than a threshold amount or decrease by more than a threshold percentage within a specified time window. For example, the second model may generate a probability score indicating how likely the network usage cost may decrease by 40% within the next six hours. The threshold percentage or the specified time window may be set by a user. For example, a user may set one or more parameters that causes the second model to generate a probability score that the network usage cost will decrease by 70% within the next three hours. In some embodiments, the second model may output a table indicating network usage cost drops (e.g., in terms of percentage change) for different time windows. For example, one row in the table may include probability scores that the network usage cost will drop by 40% for each time window (e.g., for each of the following windows: a 5 minute window, a 10 minute window, a 3 hour window, a 6 hour window, etc.). As an additional example, a second row in the table may include probability scores that the network usage cost will drop by 20% for each time window (e.g., for each of the following windows: a 5 min window, a 10 minute window, a 3 hour window, a 6 hour window, etc.).

Referring back to FIG. 7, at step 710, process 700 (e.g., using one or more components described above) may determine a minimum network usage cost. For example, the network resource system 102 may determine a minimum network usage cost of the plurality of network usage costs that were generated at step 708. The plurality of network usage costs may be sorted in order of usage costs and the smallest usage costs may be selected.

At step 712, process 700 (e.g., using one or more components described above) may determine a time to send the data to the node in the blockchain network. For example, the network resource system 102 may determine, based on the minimum network usage cost, a time to send the data to the node in the blockchain network. The time may correspond to a minimum network usage cost of the plurality of network usage costs. For example, the network resource system 102 may determine to send the data at or around the time indicated by the timestamp that corresponds to the minimum network usage cost.

At step 714, process 700 (e.g., using one or more components described above) may schedule the data to be sent at the determined time. For example, the network resource system 102 may send the data via the communication subsystem 112 at the determined time.

In some embodiments, the data may be sent as a batch with other data associated with other requests. In some embodiments, the determined time may be recommended to other users or user devices. For example, based on determining a time to send the data to the node in the blockchain network, the network resource system 102 may determine a plurality of devices associated with other requests to send data to the node in the blockchain network. The network resource system 102 may send, to each device of the plurality of devices, a recommendation to send data (e.g., perform a transaction) at the determined time.

In some embodiments, the network resource system 102 may provide an explanation for output generated by the machine learning model. For example, the network resource system 102 may explain why a particular time would correspond to the lowest network usage cost in the future time period. The network resource system 102 may use counterfactual samples to provide an explanation for output generated by the machine learning model. For example, the network resource system 102 may generate, based on the output and the blockchain data, a counterfactual sample. The network resource system 102 may generate, based on the counterfactual sample, an explanation indicating that the minimum network usage cost corresponds to a time at which a number of active miners on the blockchain network is greater than other times associated with the plurality of network usage costs. The network resource system 102 may send the explanation to a user device. As an additional example, the network resource system 102 may generate, based on the output and the blockchain data, a counterfactual sample (e.g., a portion of the blockchain data may be modified such that output generated by the machine learning model is different from the original output generated based on the blockchain data). The network resource system 102 may generate, based on the counterfactual sample, an explanation indicating that the minimum network usage cost corresponds to a time at which usage of the blockchain network is below a threshold usage level. The network resource system 102 may send the explanation to a user device.

In some embodiments, the network resource system 102 may determine ranges for network costs. For example, based on the output of the machine learning model, the network resource system 102 may determine a network cost range for each network usage cost of the plurality of network usage costs.

In some embodiments, the network resource system 102 may determine that the data should not be sent or that the network resource system 102 should wait for a time period until a better (e.g., lower) network usage cost can be achieved. For example, the network resource system 102 may determine, based on the output of the machine learning model, that the minimum network usage cost is greater than a threshold cost. Based on the minimum network usage cost being greater than the threshold cost, the network resource system 102 may postpone sending the data to the node in the blockchain network. In some embodiments, the network resource system 102 may receive input from a user indicating whether the user would like to wait for a lower network usage cost before sending the data to the node in the blockchain. For example, the network resource system 102 may receive, from a user device, input indicating that the data should not be sent to the node in the blockchain network until the network usage cost is lower than a user preferred threshold cost. The network resource system 102 may generate, via the machine learning model, an indication of a time at which the network usage cost will be lower than the user preferred threshold cost.

In some embodiments, the network resource system 102 may determine a network usage cost that may enable the data to be sent, stored or executed on a blockchain more quickly. For example, blockchain node operators may be incentivized to store or execute data on a blockchain if a higher network usage cost is paid. The network resource system 102 may attempt to predict the minimum network usage cost to make sure that the incentive is high enough (e.g., higher than a threshold amount) to make sure blockchain node operators choose the user's data over other data to store or execute on the blockchain. The network usage cost determined by the network resource system 102 may be an amount that is predicted to cause the data to be stored in less than a threshold amount of time. By doing so, the network resource system 102 may improve the ability to predict how much should be paid to ensure quick recordation of data on a blockchain. In this way, the use may not need to guess how much the network usage cost should be and may avoid network usage costs that are unnecessarily high. In some embodiments, a user may indicate a preferred network usage cost. The network resource system 102 may monitor network usage costs and send or execute data if the network usage cost reaches at or below the preferred network usage cost.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: obtaining a request to send data to a node in a blockchain network; obtaining blockchain data corresponding to a predetermined time window; inputting the blockchain data into a machine learning model; based on inputting the blockchain data into the machine learning model, generating output indicating a plurality of network usage costs for a future time period, wherein each network usage cost of the plurality of network usage costs corresponds to a timestamp within the future time period; determining a minimum network usage cost of the plurality of network usage costs; determining, based on the minimum network usage cost, a time to send the data to the node in the blockchain network, wherein the time corresponds to a minimum network usage cost of the plurality of network usage costs; and scheduling the data to be sent at the determined time.
2. The method of any of the preceding embodiments, wherein the machine learning model comprises a long short-term memory model or a regression model.
3. The method of any of the preceding embodiments, wherein the machine learning model has been trained on a time series dataset corresponding to a historical time period, the time series data comprising a second plurality of block sizes and a second plurality of network usage costs during the historical time period.
4. The method of any of the preceding embodiments, wherein scheduling the data to be sent at the determined time comprises: based on determining a time to send the data to the node in the blockchain network, determining a plurality of devices associated with other requests to send data to the node in the blockchain network; and sending, to each device of the plurality of devices, a recommendation to send data at the determined time.
5. The method of any of the preceding embodiments, wherein the blockchain data comprises a first plurality of network usage costs, and wherein inputting the blockchain data into the machine learning model comprises: generating a plurality of embeddings that are representative of the first plurality of network usage costs; and inputting the plurality of embeddings into the machine learning model.
6. The method of any of the preceding embodiments, wherein the blockchain data comprises a first plurality of block sizes, and wherein inputting the blockchain data into the machine learning model comprises: generating a plurality of embeddings that are representative of the first plurality of block sizes; and inputting the plurality of embeddings into the machine learning model.
7. The method of any of the preceding embodiments, further comprising: generating, based on the output and the blockchain data, a counterfactual sample, generating, based on the counterfactual sample, an explanation indicating that the minimum network usage cost corresponds to a time at which a number of active miners on the blockchain network is greater than other times associated with the plurality of network usage costs; and sending the explanation to a user device.

8. The method of any of the preceding embodiments, further comprising: generating, based on the output and the blockchain data, a counterfactual sample, generating, based on the counterfactual sample, an explanation indicating that the minimum network usage cost corresponds to a time at which usage of the blockchain network is below a threshold usage level; and sending the explanation to a user device.

9. The method of any of the preceding embodiments, further comprising: determining, based on the output of the machine learning model, a network cost range for each network usage cost of the plurality of network usage costs.

10. The method of any of the preceding embodiments, further comprising: determining, based on the output of the machine learning model, that the minimum network usage cost is greater than a threshold cost; and based on the minimum network usage cost being greater than the threshold cost, postponing sending the data to the node in the blockchain network.

11. The method of any of the preceding embodiments, further comprising: receiving, from a user device, input indicating that the data should not be sent to the node until the network usage cost is lower than a user preferred threshold cost; and generating, via the machine learning model, an indication of a time at which the network usage cost will be lower than the user preferred threshold cost.

12. The method of any of the preceding embodiments, wherein the machine learning model comprises a first model that determines an average network usage cost for each timestamp in the future time period, and wherein the machine learning model comprises a second model that determines, based on output of the first model, a probability that the network usage cost will drop a threshold amount.

11. A tangible, non-transitory, machine-readable medium storing instructions that, when executed by a data processing apparatus, cause the data processing apparatus to perform operations comprising those of any of embodiments 1-12.

12. A system comprising one or more processors; and memory storing instructions that, when executed by the processors, cause the processors to effectuate operations comprising those of any of embodiments 1-12.

13. A system comprising means for performing any of embodiments 1-12.

What is claimed is:

1. A machine learning system for reducing computer network usage inefficiencies by using machine learning and time series data to determine an efficient time to send data, the system comprising:
one or more processors programmed with computer program instructions that, when executed by the one or more processors, cause operations comprising:
obtaining a request to send data to a node in a blockchain network, wherein the request comprises a data recipient, a priority network usage cost, and a maximum network usage cost;
obtaining blockchain data corresponding to a predetermined time window, wherein the blockchain data comprises a first plurality of block sizes, and a first plurality of network usage costs;
inputting the blockchain data into a machine learning model, wherein the machine learning model has been trained on a time series dataset corresponding to a historical time period, the time series dataset comprising a second plurality of block sizes and a second plurality of network usage costs during the historical time period;
generating, via the machine learning model, output indicating a plurality of network usage costs for a future time period, wherein each network usage cost of the plurality of network usage costs corresponds to a timestamp within the future time period;
determining a minimum network usage cost of the plurality of network usage costs;
determining a time to send the data to the node in the blockchain network, wherein the time corresponds to the minimum network usage cost of the plurality of network usage costs; and
scheduling the data to be sent at the determined time.

2. The system of claim 1, wherein the machine learning model comprises a first model that determines an average network usage cost for each timestamp in the future time period, and wherein the machine learning model comprises a second model that determines, based on output of the first model, a probability that the network usage cost will drop a threshold amount.

3. A method for reducing computer network usage inefficiencies, the method comprising:
obtaining a request to send data to a node in a blockchain network;
obtaining blockchain data corresponding to a predetermined time window;
inputting the blockchain data into a machine learning model;
based on inputting the blockchain data into the machine learning model, generating output indicating a plurality of network usage costs for a future time period, wherein each network usage cost of the plurality of network usage costs corresponds to a timestamp within the future time period;
determining a minimum network usage cost of the plurality of network usage costs;
determining a time to send the data to the node in the blockchain network, wherein the time corresponds to the minimum network usage cost of the plurality of network usage costs; and
scheduling the data to be sent at the determined time, wherein scheduling the data to be sent at the determined time comprises:
based on determining the time to send the data to the node in the blockchain network, determining a plurality of devices associated with other requests to send respective data to the node in the blockchain network; and
sending, to each device of the plurality of devices, a recommendation to send respective data at the determined time.

4. The method of claim 3, wherein the machine learning model comprises a long short-term memory model or a regression model.

5. The method of claim 3, wherein the machine learning model has been trained on a time series dataset corresponding to a historical time period, the time series dataset comprising a second plurality of block sizes and a second plurality of network usage costs during the historical time period.

6. The method of claim 3, wherein the blockchain data comprises a first plurality of network usage costs, and wherein inputting the blockchain data into the machine learning model comprises:
generating a plurality of embeddings that are representative of the first plurality of network usage costs; and
inputting the plurality of embeddings into the machine learning model.

7. The method of claim 3, wherein the blockchain data comprises a first plurality of block sizes, and wherein inputting the blockchain data into the machine learning model comprises:
generating a plurality of embeddings that are representative of the first plurality of block sizes; and
inputting the plurality of embeddings into the machine learning model.

8. The method of claim 3, further comprising:
generating, based on the output and the blockchain data, a counterfactual sample;
generating, based on the counterfactual sample, an explanation indicating that the minimum network usage cost corresponds to a given time at which a number of active miners on the blockchain network is greater than other times associated with the plurality of network usage costs; and
sending the explanation to a user device.

9. The method of claim 3, further comprising:
generating, based on the output and the blockchain data, a counterfactual sample;
generating, based on the counterfactual sample, an explanation indicating that the minimum network usage cost corresponds to a given time at which usage of the blockchain network is below a threshold usage level; and
sending the explanation to a user device.

10. The method of claim 3, further comprising:
determining, based on the output of the machine learning model, a network cost range for each network usage cost of the plurality of network usage costs,
wherein determining the minimum network usage cost of the plurality of network usage costs comprises determining, based on one or more of the network cost ranges, a minimum network usage cost of the plurality of network usage costs.

11. The method of claim 3, further comprising:
determining, based on the output of the machine learning model, that the minimum network usage cost is greater than a threshold cost; and
based on the minimum network usage cost being greater than the threshold cost, postponing sending the data to the node in the blockchain network.

12. One or more non-transitory, computer-readable media comprising instructions that when executed by one or more processors, causes operations comprising:
obtaining a request to send data to a node in a blockchain network;
obtaining blockchain data corresponding to a predetermined time window;
inputting the blockchain data into a machine learning model;
based on inputting the blockchain data into the machine learning model, generating output indicating a plurality of network usage costs for a future time period, wherein each network usage cost of the plurality of network usage costs corresponds to a timestamp within the future time period;
determining, based on the output of the machine learning model, a network cost range for each network usage cost of the plurality of network usage costs and determining a minimum network usage cost of the plurality of network usage costs;
determining a time to send the data to the node in the blockchain network, wherein the time corresponds to the minimum network usage cost of the plurality of network usage costs; and
scheduling the data to be sent at the determined time.

13. The media of claim 12, wherein the machine learning model comprises a long short-term memory model or a regression model.

14. The media of claim 12, wherein the machine learning model has been trained on a time series dataset corresponding to a historical time period, the time series dataset comprising a second plurality of block sizes and a second plurality of network usage costs during the historical time period.

15. The media of claim 12, wherein scheduling the data to be sent at the determined time comprises:
based on determining the time to send the data to the node in the blockchain network, determining a plurality of devices associated with other requests to send respective data to the node in the blockchain network; and
sending, to each device of the plurality of devices, a recommendation to send respective data at the determined time.

16. The media of claim 12, wherein the blockchain data comprises a first plurality of network usage costs, and wherein inputting the blockchain data into the machine learning model comprises:
generating a plurality of embeddings that are representative of the first plurality of network usage costs; and
inputting the plurality of embeddings into the machine learning model.

17. The media of claim 12, wherein the blockchain data comprises a first plurality of block sizes, and wherein inputting the blockchain data into the machine learning model comprises:
generating a plurality of embeddings that are representative of the first plurality of block sizes; and
inputting the plurality of embeddings into the machine learning model.

18. The media of claim 12, the operations further comprising:
generating, based on the output and the blockchain data, a counterfactual sample;
generating, based on the counterfactual sample, an explanation indicating that the minimum network usage cost corresponds to a given time at which a number of active miners on the blockchain network is greater than other times associated with the plurality of network usage costs; and
sending the explanation to a user device.

19. The media of claim 12, the operations further comprising:
generating, based on the output and the blockchain data, a counterfactual sample;
generating, based on the counterfactual sample, an explanation indicating that the minimum network usage cost corresponds to a given time at which usage of the blockchain network is below a threshold usage level; and
sending the explanation to a user device.

20. The media of claim 12, the operations further comprising:
- determining, based on the output of the machine learning model, that the minimum network usage cost is greater than a threshold cost; and
- based on the minimum network usage cost being greater than the threshold cost, postponing sending the data to the node in the blockchain network.

21. The media of claim 12, the operations further comprising:
- receiving, from a user device, input indicating that the data should not be sent to the node until the network usage cost is lower than a user preferred threshold cost; and
- generating, via the machine learning model, an indication of a given time at which the network usage cost will be lower than the user preferred threshold cost.

22. The media of claim 12, wherein the machine learning model comprises a first model that determines an average network usage cost for each timestamp in the future time period, and wherein the machine learning model comprises a second model that determines, based on output of the first model, a probability that the network usage cost will drop a threshold amount.

* * * * *